United States Patent [19]

Whittington

[11] Patent Number: 4,930,187
[45] Date of Patent: Jun. 5, 1990

[54] METHOD AND APPARATUS FOR SPLITTING CHICKEN WINGS

[75] Inventor: Jackie T. Whittington, Purlear, N.C.

[73] Assignee: Holly Farms Foods, Inc., Wilkesboro, S.C.

[21] Appl. No.: 373,896

[22] Filed: Jun. 29, 1989

[51] Int. Cl.⁵ .............................................. A22C 21/00
[52] U.S. Cl. ............................................. 17/11; 17/52
[58] Field of Search ...................................... 17/11, 52

[56] References Cited

U.S. PATENT DOCUMENTS

| Re. 32,697 | 6/1988 | Hazenbroek et al. | 17/11 |
| 4,207,653 | 6/1980 | Gasbarro | 17/11 |
| 4,563,791 | 1/1986 | Martin et al. | 17/11 |
| 4,597,136 | 7/1986 | Hazenbroek | 17/11 |
| 4,715,092 | 12/1987 | Lerner et al. | 17/11 |
| 4,769,872 | 9/1988 | Hazenbroek et al. | 17/11 |

Primary Examiner—Willis Little
Attorney, Agent, or Firm—Bell, Seltzer, Park & Gibson

[57] ABSTRACT

The invention comprises an apparatus and method for positioning and maintaining the mid-joint portion of a chicken wing in a generally planar orientation, and then splitting the mid-joint between the bones and generally perpendicularly to the planar orientation of the mid-joint, all while substantially avoiding cutting the bones or removing meat from the bones.

15 Claims, 4 Drawing Sheets

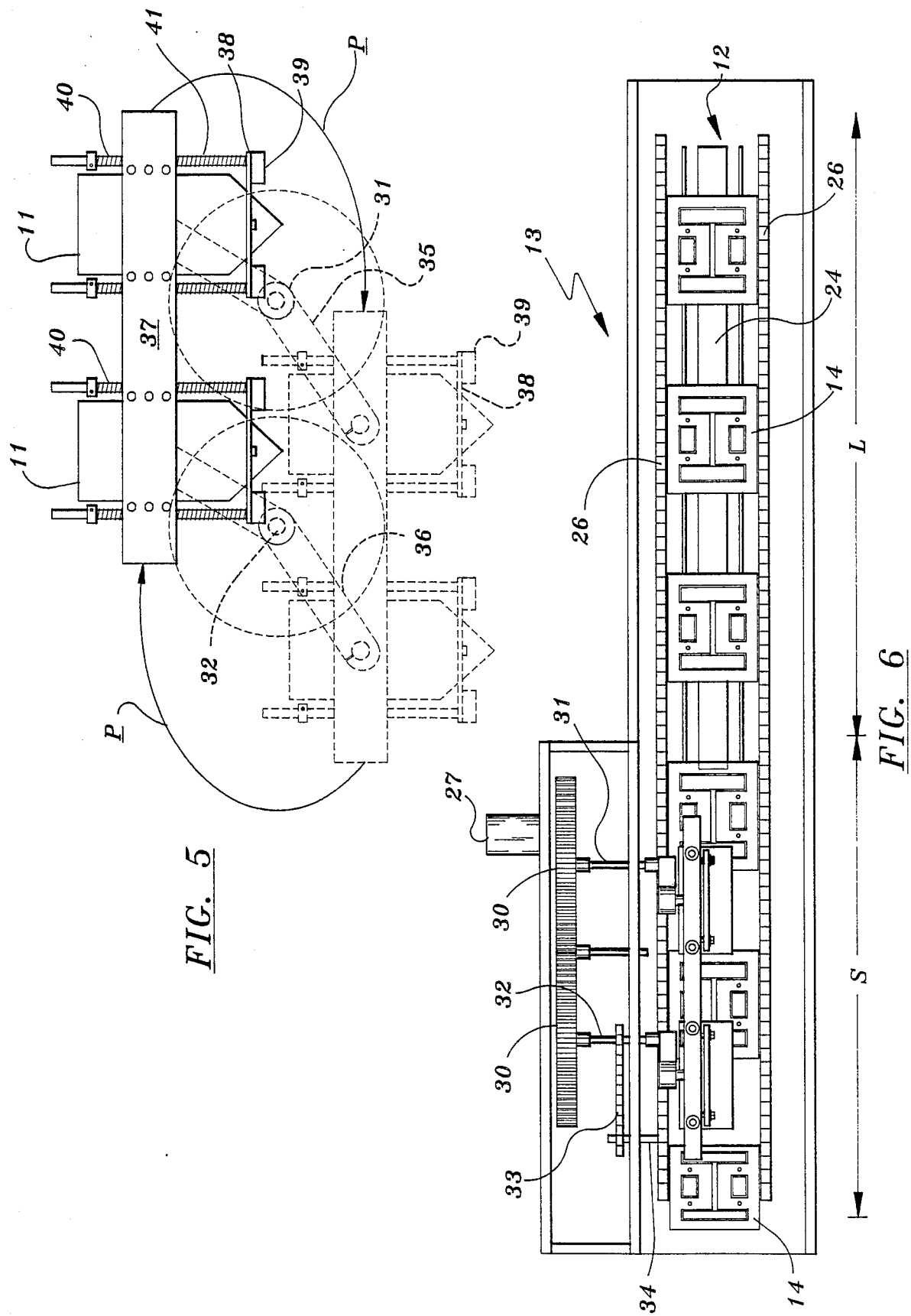

METHOD AND APPARATUS FOR SPLITTING CHICKEN WINGS

FIELD OF THE INVENTION

The present invention relates to the automated separation of slaughtered poultry carcasses into individual parts suitable for retail sale, and in particular relates to a method and apparatus for splitting the mid-joint portion of a chicken wing into two pieces each of which is formed of one of the bones of the mid-joint and associated meat portions.

BACKGROUND OF THE INVENTION

Over the past several decades, there has been a wide increase in the retail sale of processed chicken, particularly in the form of prepackaged specific parts of chickens such as wings, breast portions, and legs. In addition to the growth in the retail market for such prepackaged parts, there has been a similar increased growth in the demand for specialized parts such as drumsticks, deboned breast portions, and various other special cuts.

As would normally be expected, processing chicken into such a variety of parts, particularly considering the large numbers of chickens presently processed commercially worldwide, requires either increased labor or some sort of mechanical assistance to produce the desired parts in the desired form in the numbers required. Where labor is expensive or simply unavailable, appropriate machinery for producing the chicken parts is a necessity.

One such chicken part which has recently come into marketplace demand is a small bone portion taken from the mid-joint portion of a chicken wing and which, because of its resemblance to a beef or pork spare rib, is referred to as a "chicken rib." As known to those familiar with poultry, a chicken wing comprises three basic portions. These are the drumette (also referred to as the "baby drum"), the mid-joint (sometimes also referred to as the "flat"), and the tip. If the human arm were used as a rough analogy, the drumette would correspond to the upper arm, the mid-joint to the forearm, and the tip to the hand. In a matter similarly analogous to the human forearm, the mid-joint portion of a chicken wing is formed of two longitudinally extending parallel bones. When the mid-joint is separated from the tip and the drumette and then split properly between the two generally parallel bones, the resulting product is the "chicken rib". The chicken rib product has a convenient size, shape and appearance and has quickly found wide acceptance, for example as an hors d'oeuvre type food, because of these characteristics. This acceptance has been demonstrated by the thirty cent per pound premium that chicken ribs presently carry over unsplit mid-joints.

Because the market demand for chicken ribs is relatively recent, production has to date proceeded by hand usually by shoving the mid-joint portion over some sort of knife to separate the two parallel bones. Needless to say, the process is labor intensive, expensive, time consuming, and potentially dangerous to the individuals carrying it out.

Additionally, in order to produce the chicken ribs in the fashion desired by the marketplace the mid-joint portions must be split in a manner which avoids cutting the bones and which maintains the meat portions intact on the bone. Bones which have been cut or from which the meat has been removed lower the quality and demand for the product. Thus, some of the automated poultry processing machinery that efficiently slices or otherwise partitions poultry is unacceptable for producing the chicken ribs, even assuming they could be adjusted to attempt the proper line of cut.

To date, no automated or semiautomated machinery or techniques exist for producing chicken ribs and thus they continue to be required to be manufactured by the disadvantageous hand method.

OBJECT AND SUMMARY OF THE INVENTION

It is accordingly an object of the present invention to provide a method and apparatus for separating the mid-joint portion of a chicken wing into two separate pieces each formed of one bone and associated meat portions while avoiding cutting the individual bones or removing meat from the bones.

The apparatus of the present invention comprises means for positioning and maintaining the mid-joint portion of a chicken wing in a generally planar orientation, and splitting means for splitting the mid-joint between the bones and generally perpendicularly to the planar orientation of the mid-joint, all while substantially avoiding cutting the bones or removing meat from the bones.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

BRIEF DESCRIPTION OF THE DRAWINGS

FIG. 2b is a top plan view of the mid-joint carrier of FIG. 2a;

FIG. 2c is a front elevational view of the mid-joint carrier of FIG. 2a;

FIG. 2d is a side elevational view of the mid-joint carrier of FIG. 2a;

FIG. 5 is an isolated view of the splitting blade apparatus of a preferred embodiment of the present invention and showing the rotational stroke of the splitting blades; and FIG. 6 is a top plan view of the apparatus of the present invention.

DETAILED DESCRIPTION OF THE INVENTION

Figure 1:
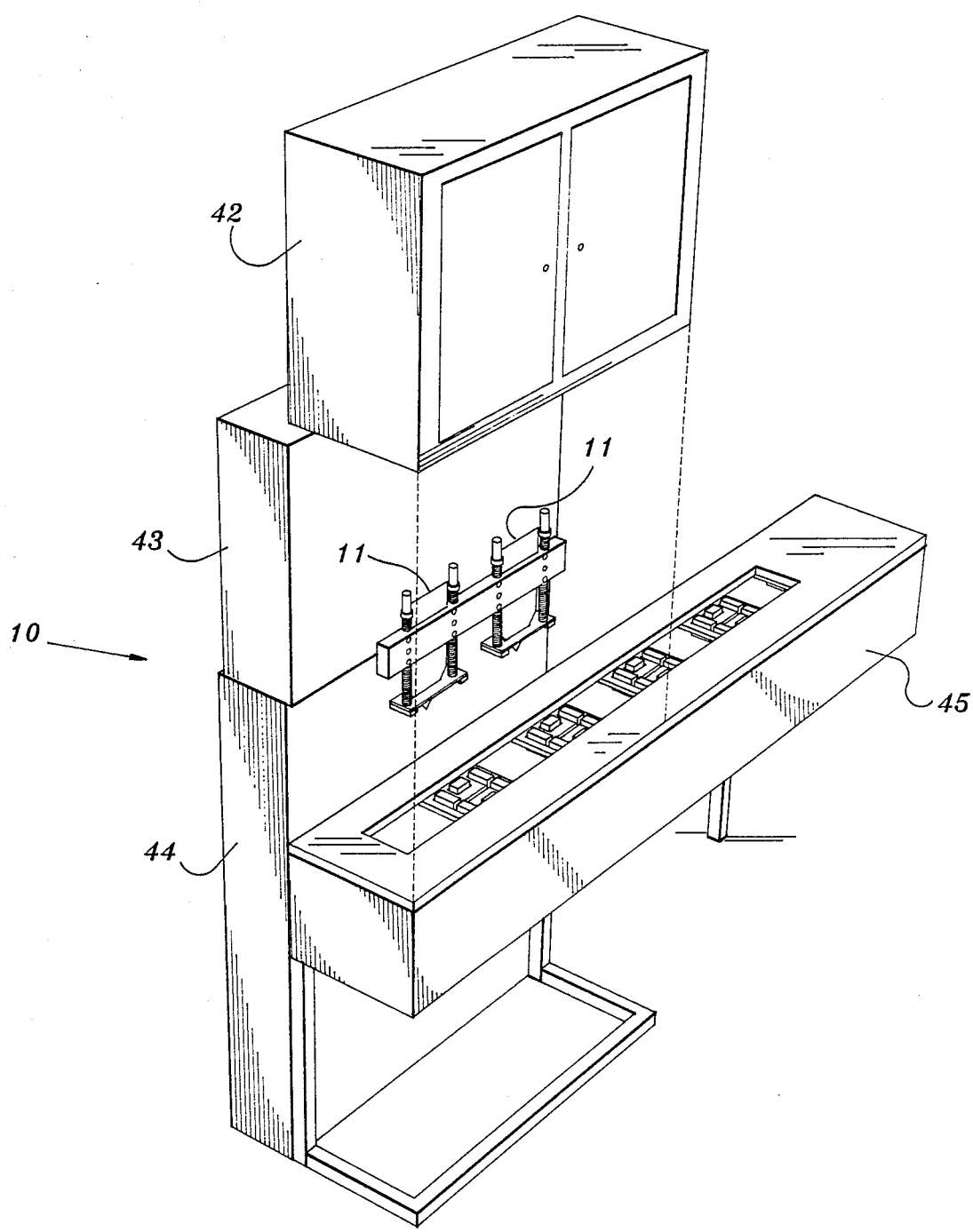
FIG. 1 is a partially exploded perspective view of an apparatus according to the present invention.

The invention is an apparatus for separating the mid-joint portion of a chicken wing into two separate pieces each formed of one substantially intact bone and associated meat portions. FIG. 1 illustrates a perspective view of the apparatus generally designated at 10. The invention comprises means for positioning and maintaining the mid-joint portion of a chicken wing in a generally planar orientation and splitting means for splitting the mid-joint portion between the bones therein and generally perpendicularly to the planar orientation of the mid-joint portion while the mid-joint portion is maintained in the positioning means while substantially avoiding cutting the bones or removing meat from the bones.

In the preferred embodiment of the invention, the splitting means comprises one or more blades 11. As will be further discussed herein, however, the term blade is used in a rather broad sense to indicate any device which will separate the two bones of the mid-joint portion from one another in a manner which avoids removing meat from the bones. Preferably, the blades perform more of a splitting function than a slicing one, so that an overly narrow or very sharp cutting edge is not necessarily required.

FIGS. 2a-2d illustrate the preferred positioning means which take the form of a plurality of mid-joint carriers broadly designated at 12. In the illustrated embodiment, each of the carriers 12 positions and maintains one individual mid-joint portion of a chicken wing. As best illustrated in FIGS. 1 and 6, the mid-joint carriers travel on a horizontally moving conveyor from a location spaced from the splitting means into the generally perpendicular position with respect to the splitting means shown as the blades 11.

FIG. 6 shows the conveyor generally designated at 13 and in conjunction with FIG. 1, shows that portions of the path of travel of the conveyor define a loading zone L and a splitting zone s respectfully for the mid-joint portions of chicken wings. The conveyor 13 carries a plurality of the mid-joint carriers 12 along its path and thus serves to carry mid-joint portions from the loading zone L to the splitting zone S and to position and maintain the mid-joint portion of a chicken wing in a generally horizontal orientation. The illustrated embodiment is suitably loaded by hand and the extension of the conVeyor 13 out from under the splitting zone permits the apparatus to be safely loaded by one or more individuals at a time.

Figure 2A:
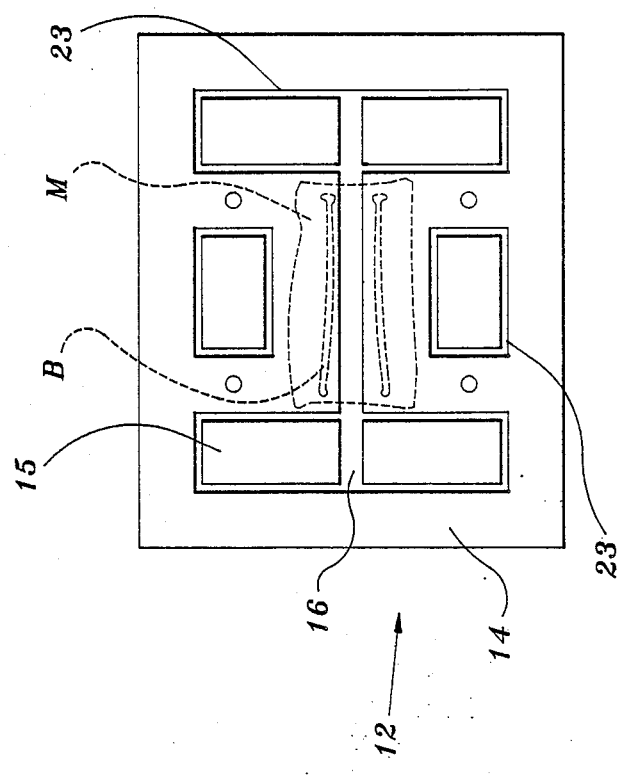
FIG. 2a is a perspective view of the a mid-joint carrier portion of the present invention.

As set forth earlier, the nature of the mid-joint portion and the desired characteristics of the chicken rib are such that splitting the mid-joint portion is a more preferable technique than is slicing or cutting it. In this regard, the structure of the wing carriers achieves this desirable result. As best illustrated in FIG. 2a, each of the mid-joint carriers 12 further comprises a horizontal plate 14 and a plurality of vertical standards 15 extending upwardly from the horizontal plate 14 which thereby define a position for carrying the mid-joint portion of the chicken wing. In other words, placing a mid-joint among the standards 15 properly positions the mid-joint for splitting. In preferred embodiments of the invention, and in accordance with appropriate sanitary and health requirements, the upright standards 15 are formed of ultra high molecular weight (UHMW) polyethylene and the plates 14 are formed of stainless steel.

Figure 2B:
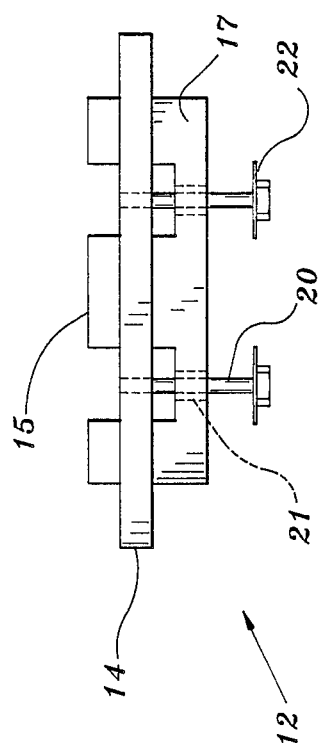

As further best illustrated in FIGS. 2a and 2b, the horizontal plate 14 of the mid-joint carrier 12 defines a longitudinally extending opening 16 along center portions of the plate 14 for receiving portions o the splitting blades 11 therein so that the splitting blades can extend through and completely separate a mid-joint without interference from the carriers 12. In accordance with this, the respective positions of the vertical standards 15 and the longitudinally extending opening 16 are related so that when a mid-joint portion M is positioned between the standards 15 (FIG. 2b), the longitudinally extended opening 16 is aligned substantially parallel to and between the bones B in the mid-joint portion.

Figure 2C:
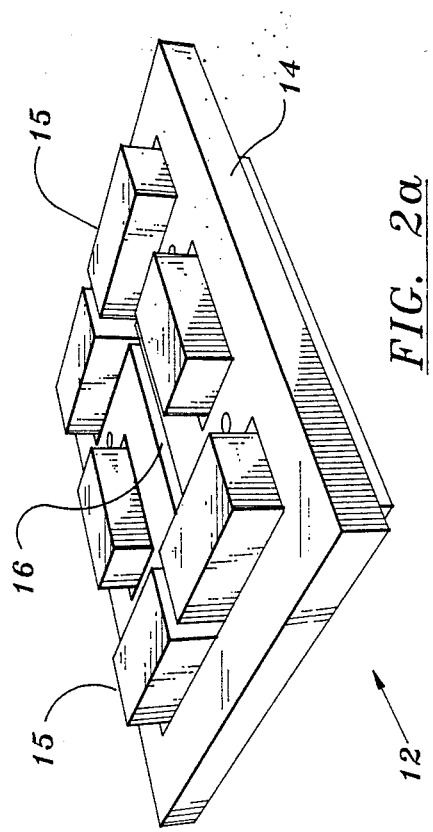
Figure 2D:
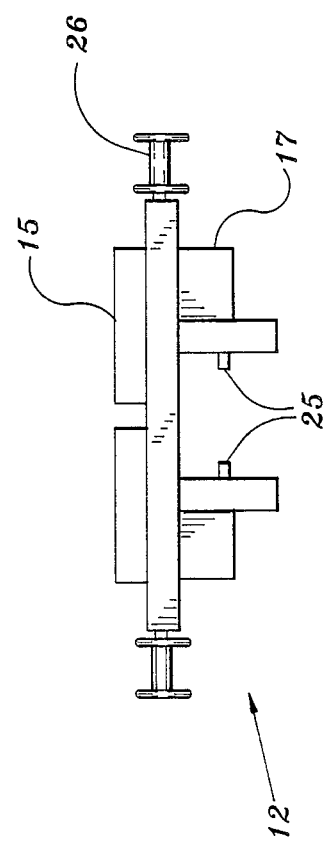

As another feature, and as best illustrated in FIG. 2d, the plates 14 and the standards 15 are movable with respect to one another so that after the standards 15 properly position a mid-joint portion on the plate 14 at the loading zone L, they then move downwardly away from the plate 14 at the splitting zone S to avoid interference with the splitting knives 11. This feature is desirable because of the nature of the mid-joint portion M and the bones B, and the cutting force exerted by the blades 11. In particular, a chicken bone is soft enough that it can be cut under some circumstances. A desirable object of the invention therefore is to separate the bones B from one another without cutting or slicing the bones themselves and similarly without cutting meat portions from the bone. It has been discovered in accordance with the present invention, that this object is most successfully accomplished when the mid-joint portion M is in the position diagramed in FIG. 2b, but is not restricted from movement during splitting. In other words, the standards 15 are necessary during loading so that the mid-joint portion M and the bones B can be properly positioned with respect to one another, but the standards 15 are undesirable when the splitting knives 11 are in the process of separating the bones from one another.

FIG. 2d illustrates that the desireable relative movement between the plate 14 and the standards 15 is accomplished by providing the upright standards in a unitary form with a common base 17. In the illustrated embodiment, the base 17 and plate 14 are movably attached to on another by a series of four shoulder bolts 20. The shoulder bolts move through openings 21 in the common base 17 and include washers 22 that help define the range of relative movement of the common base 17 and hence that of the standards 15 with respect to the plate 14. Further to this object, the plate 14 also includes a series of openings 23 through which the standards 15 can freely move.

In order to accomplish the desired raising and lowering of the standards 15 at the proper time and in the proper sequence, the carriers 12 ride on a cam rail 24 (FIG. 6) using the small cam followers 25 that are illustrated in FIG. 2c. The relationship between the position of the cam rail 24 and the conveyor 13 is such that when the carriers 12 are traveling along the cam rail 24 the common base 17 and resulting the standards 15 extend upwardly from the plates 14 and provide a well defined position for the mid-joint portions M as individual operators load them into the carriers 12.

The cam rail 24, however, ends just beyond the loading zone, so that as the conveyor 13 continues to carry the carriers along, the common base 17 is free to drop to the level defined by the washers 22 on the shoulder bolts 20. As a result, at this point along their path of travel the mid-joint portions are properly aligned with respect to the blades 11, but are not restricted by the standards 15 during the splitting action. As stated earlier, the proper alignment of the mid-joint with the splitter blade 11, combined with a degree of freedom to move in the absence of the standards 15, results in a consistent, desireable splitting action, rather than undesirable slicing or cutting.

FIG. 2c also shows that the conveyor means 13 moves the carriers 12 using a chain conveyor 26 to which the carriers are attached, and main portions of which are visible in FIG. 6.

In the preferred embodiment, and as illustrated in the drawings, the splitting blade means comprises two splitting blades 11 which are positioned adjacent one another in side-by-side relationship so that two mid-joint portions can be separated at the same time. Furthermore, and as best illustrated in FIG. 5, the vertical movement of the splitting blades 11 comprises a rotational stroke path P of which lower portions coincide with the path of travel of the conveyor 13 so that the blades 11 can meet and split the mid-joints travelling thereunder. The rotational stroke path provides an efficient and mechanically sound method of producing a vertical stroke between the blades 11 and the mid-joint portions M on the plates 14.

FIG. 6 illustrates that in the preferred embodiment the entire apparatus 10 is driven by an electric motor 27 of which a three-quarter horse power motor has proven satisfactory in present applications. The motor 27 drives a pair of gears 30 which drive both the conveyor 13 and the rotational stroke of the blades 11. As seen in FIG. 6, shafts 31 and 32 are driven by the gears 30 and in turn drive the rotational stroke of the blades 11. Additionally, shaft 32, chain 33, and shaft 34 combine to drive the chain conveyor 26.

As shown in FIG. 5, shafts 31 and 32 in turn drive arms 35 and 36 respectfully. As arms 35 and 36 rotate about shafts 31 and 32 they drive their respective blades 11 in the rotational path. As further seen in FIG. 5, the blades 11 are positioned on a common standard 37. The standard 37 also carries respective upper springs 40 and lower springs 41. The loWer springs 41 bias a plate 38 downwardly while the plate 38 travels with the blade 11. The plate 38 in turn carries a pair of feet 39 made from UHMW polyethylene. These feet 39 contact the vertical standards 15 when the splitting blade 11 contacts a mid-joint portion. The plate 38 and feet 39 thus help stabilize a mid-joint portion during the separating step. When the blade 11 travels upwardly after splitting the mid-joint portion, the upper springs 40 act as shock absorbers and lessen the noise produced by the apparatus.

As a result, the splitting blades are vertically moveable between retracted position above the conveyor 13 and a splitting position along the path of the conveyor 13 for splitting the mid-joint portions M between the bones and generally perpendicularly to the horizontal orientation of the mid-joint portion M when the positions of the carriers 12 and the splitting blades 11 coincide along the path of travel of the conveyor 13, all while substantially avoiding cutting the bones or removing meat from the bones. The coincidence of the path of travel of the conveyor and the splitting blades 11 is perhaps best shown in FIG. 3 in which the raised position of the blades is indicated by the drawings in solid lines and the lowered position is indicated by the drawings in dashed lines.

The rotational stoke path P of the splitting blades 11 has a somewhat horizontal component along the lower portions thereof that imparts a sawing motion that enhances the splitting action of the blades 11 upon the mid-joint portions M. Furthermore, in a typical embodiment, the openings 16 in the plates 14 are wider than the lower portions of the splitting blades 11 so that the separation-enhancing horizontal component of the stroke path can be accomodated. It has been found according to the present invention that this horizontal component and the resulting sawing action are particularly useful features in obtaining the chicken rib product.

Figure 4:
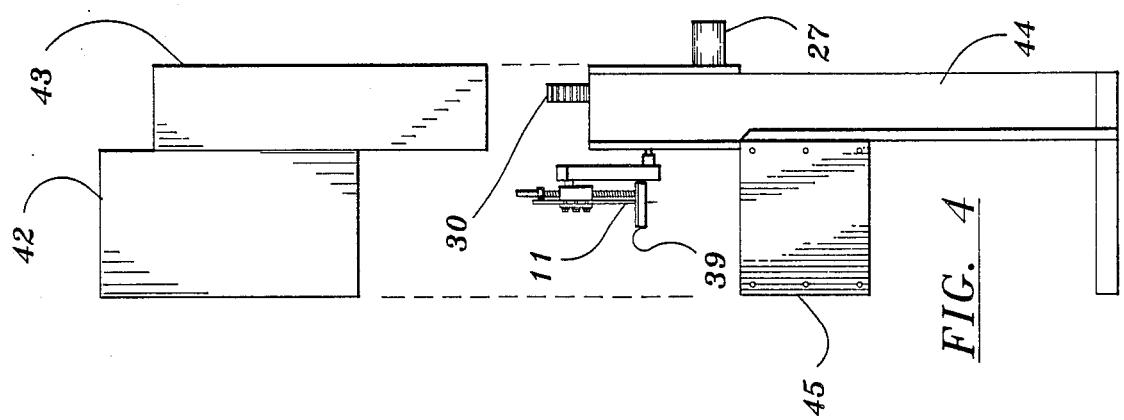
FIG. 4 is a partially exploded side elevational view of the present invention.
Figure 3:
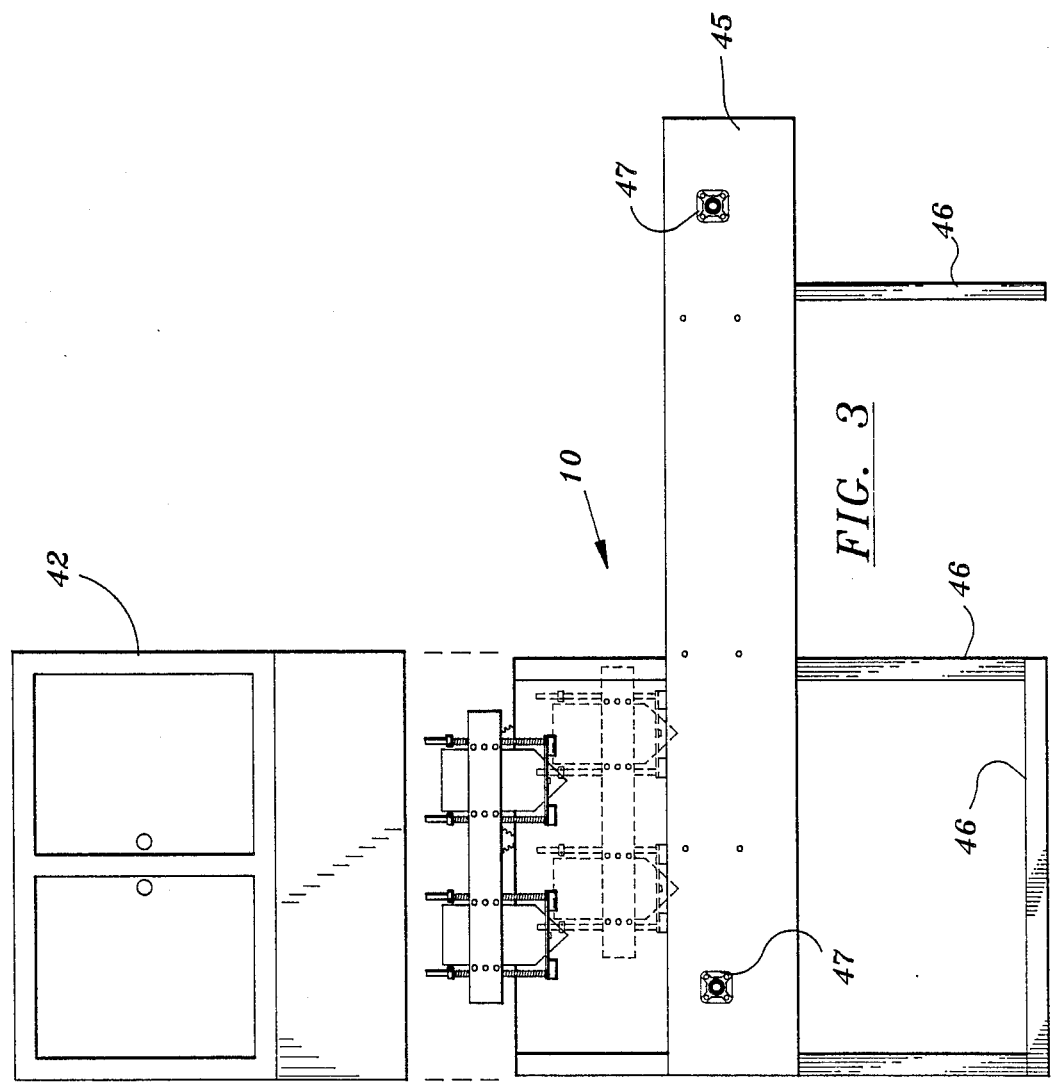
FIG. 3 is a partially exploded front elevational view of the present invention.

FIGS. 1, 3 and 4 also show some other features of the invention. The splitting zone S of the apparatus 10 is housed in cabinet 42 while the gears and shafts are housed in adjacent cabinets 43 and 44. The conveyor 13 is likewise housed in a horizontally extending cabinet 45 through which water can be run at appropriate intervals for cleaning the machine in accordance with health and safety standards.

The entire apparatus is supported by a framework formed by a series of stainless steel tubing portions 46 which are positioned both horizontally and vertically as appropriate. FIG. 3 also shows the axles 47 for the opposite ends of the chain conveyor 26.

After the mid-joint portions are split, they continue to travel on the plates 14 until the plates pivot at the end of the conveyor 13 to begin their return path (FIG. 6). At this point the split portions are free to drop from the plates 14 and be collected in any suitable manner. For example, the split portions can be collected in appropriate containers, or they can drop onto yet another conveyor system to be transported elsewhere for further processing or packaging.

The invention also accordingly comprises a method of separating the mid-joint portion of a chicken wing into two separate pieces each formed of one bone and associated meat portions. The method comprises positioning and maintaining the mid-joint portion of a chicken wing in a generally planar orientation, forwarding the mid-joint portion along a predetermined path of travel to a splitting means, and splitting the mid-joint portion between the bones therein and generally perpendicularly to the planar orientation of the mid-joint portion, while avoiding cutting the bones or removing meat from the bones.

In a particular embodiment the step of positioning and maintaining the mid-joint portion of a chicken wing in a generally planar orientation comprises placing the mid-joint portion in a carrier that defines an aligned position for the mid-joint portion; the step of forwarding the mid-joint portion along a predetermined path of travel to a splitting means comprises forwarding the carriers for the mid-joint portions along a conveyor from a loading zone to a splitting zone; and the step of splitting the mid-joint portion between the bones therein comprises driving a splitting blade between the bones of the positioned mid-joint portions while permitting sufficient freedom of movement to the mid-joint portion to prevent the splitting blade from slicing the bones or removing meat from the bones.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. An apparatus for splitting the mid-joint portion of a chicken wing that has been previously separated from the tip portion and the drumette portion into two individual pieces each formed of one of the longitudinally extending parallel bones and associated meat portions, the apparatus comprising:

splitting means comprising a blade for splitting a mid-joint portion of a chicken wing that has been previously separated from the tip portion and the drumette portion between the longitudinally extending parallel bones therein while substantially avoiding cutting the bones or removing meat from the bones;

a plurality of mid-joint carriers on a horizontaly moving conveyor for receiving a plurality of mid-joint portions at a location spaced from said splitting means and for moving the mid-joint portions into a generally perpendicular position with respect to said splitting means; and wherein each said carrier is sized to position and carry one individual mid-joint portion of a chicken wing; and means associated with said splitting means for contacting and stabilizing a mid-joint portion while said splitting means splits the mid-joint portion.

2. An apparatus for splitting the mid-joint portion of a chicken wing that has been previously separated from the tip portion and the drumette portion into two individual pieces each formed of one of the longitudinally extending parallel bones and associated meat portions, the apparatus comprising:

a generally horizontally disposed conveyor, portions of the path of travel of which define a loading zone and a splitting zone respectively for mid-joint portions of chicken wings that have been previously separated from their respective tip portion and drumette portion;

a plurality of mid-joint carriers associated with said conveyor for travelling therealong and for carrying separated mid-joint portions from said loading zone to said splitting zone and for positioning and maintaining the separated mid-joint portion of a chicken wing in a generally horizontal orientation; and splitting blade means vertically moveable between a retracted position above said conveyor and a splitting position along the path of said conveyor for splitting the separated mid-joint portions of chicken wings longitudinally between the bones therein and generally perpendicularly to the horizontal orientation of the mid-joint portion when the positions of said carriers and said splitting blade coincide along said path of travel of said conveyor, while substantially avoiding cutting the b ones or removing meat from the bones; and a plurality of depending feet carried by said splitting means for contacting and stabilizing a mid-joint portion while said splitting means splits the mid-joint portion.

3. An apparatus according to claim 2 wherein said splitting blade means comprises two splitting blades positioned adjacent one another in side by side relationship.

4. An apparatus according to claim 3 further comprising means for moving said vertically movable splitting blades in a rotational stroke path, lower portions of which coincide with said path of travel of said conveyor, and which rotational stroke path imparts a sawing motion that enhances the splitting action of said blades.

5. An apparatus according to claim 2 wherein each of said carriers further comprises a horizontal plate upon which a separated mid-joint portion may rest and a plurality of vertical standards extending upwardly from said horizontal plate that define a position for carrying the separated mid-joint portion of a chicken wing.

6. An apparatus according to claim 5 further comprising means for permitting sufficient movement of the mid-joint portion during splitting to prevent said splitting blade means from substantially cutting the bones or removing meat from the bones.

7. An apparatus according to claim 5 wherein said horizontal plate defines a longitudinally extending opening along center portions thereof for receiving portions of said splitting blade means therein so that said splitting blade means can extend through and completely split a separated mid-joint portion without interference from said carriers.

8. An apparatus according to claim 7 wherein the respective positions of said vertical standards and said longitudinally extending opening are related so that when a separated mid-joint portion is positioned between said standards, said longitudinally extending opening is aligned substantially parallel to and between the bones in the mid-joint portion.

9. An apparatus according to claim 7 wherein said longitudinal opening is wider than the lower portions of said splitting blade so that the sawing motion of said blade is accomodated and the splitting action enhanced.

10. An apparatus according to claim 5 wherein said standards are formed of ultra high molecular weight polyethylene and said plates are formed of stainless steel.

11. An apparatus according to claim 5 further comprising means for moving said plates and said standards with respect to one another so that said standards properly position a separated mid-joint portion on said plate at said loading zone and then move downwardly away from said plate at said splitting zone to avoid interference with said splitting blades at said splitting zone.

12. A method of splitting the mid-joint portion of a chicken wing that has been previously separated from the tip portion and the drumette portion into two individual pieces each formed of one of the longitudinally extending parallel bones and associated meat portions, the method comprising:

positioning and maintaining the mid-joint portion of a chicken wing that has been previously separated from the tip portion and the drumette portion in a generally planar orientation;

forwarding the separated mid-joint portion along a predetermined path of travel to a splitting means; and splitting the separated mid-joint portion longitudinally between the bones therein and generally perpendicularly to the planar orientation of the mid-joint portion, while avoiding cutting the bones or removing meat from the bones.

13. A method according to claim 12 wherein the step of positioning and maintaining the separated mid-joint portion of a chicken wing in a generally planar orientation comprises placing the mid-joint portion in a carrier that defines an aligned position for the mid-joint portion.

14. A method according to claim 13 wherein the step of forwarding the separated mid-joint portion along a predetermined path of travel to a splitting means comprises forwarding the carriers for the mid-joint portions along a conveyor from a loading zone to a splitting zone.

15. A method according to claim 12 wherein the step of splitting the separated mid-joint portion between the longitudinally extending parallel bones therein comprises driving a splitting blade between the bones of the positioned mid-joint portion while permitting sufficient freedom of movement to the mid-joint portion to prevent the splitting blade from slicing the bones or removing meat from the bones.

* * * * *

UNITED STATES PATENT AND TRADEMARK OFFICE
CERTIFICATE OF CORRECTION

PATENT NO.  : 4,930,187
DATED       : June 5, 1990
INVENTOR(S) : Whittington

It is certified that error appears in the above-identified patent and that said Letters Patent is hereby corrected as shown below:

In the face of the Letters Patent, the Assignee's address appears as "Wilkesboro, S.C." and should be --Wilkesboro, N.C.--.

In the Specification:

Column 3, line 28, the letter "s" should be --S--.
Column 3, line 32, the symbol "$" should be --S--.
Column 3, line 36, the word "conVeyor" should be --conveyor--.
Column 3, line 59, the letter "o" should be --of--.
Column 4, line 31, the word "on" should be --one--.
Column 5, line 30, the word "loWer" should be --lower--.
Column 7, line 43, "b ones" should be --bones--.

Signed and Sealed this

Twenty-first Day of January, 1992

Attest:

HARRY F. MANBECK, JR.

*Attesting Officer*  *Commissioner of Patents and Trademarks*